Figure 1:
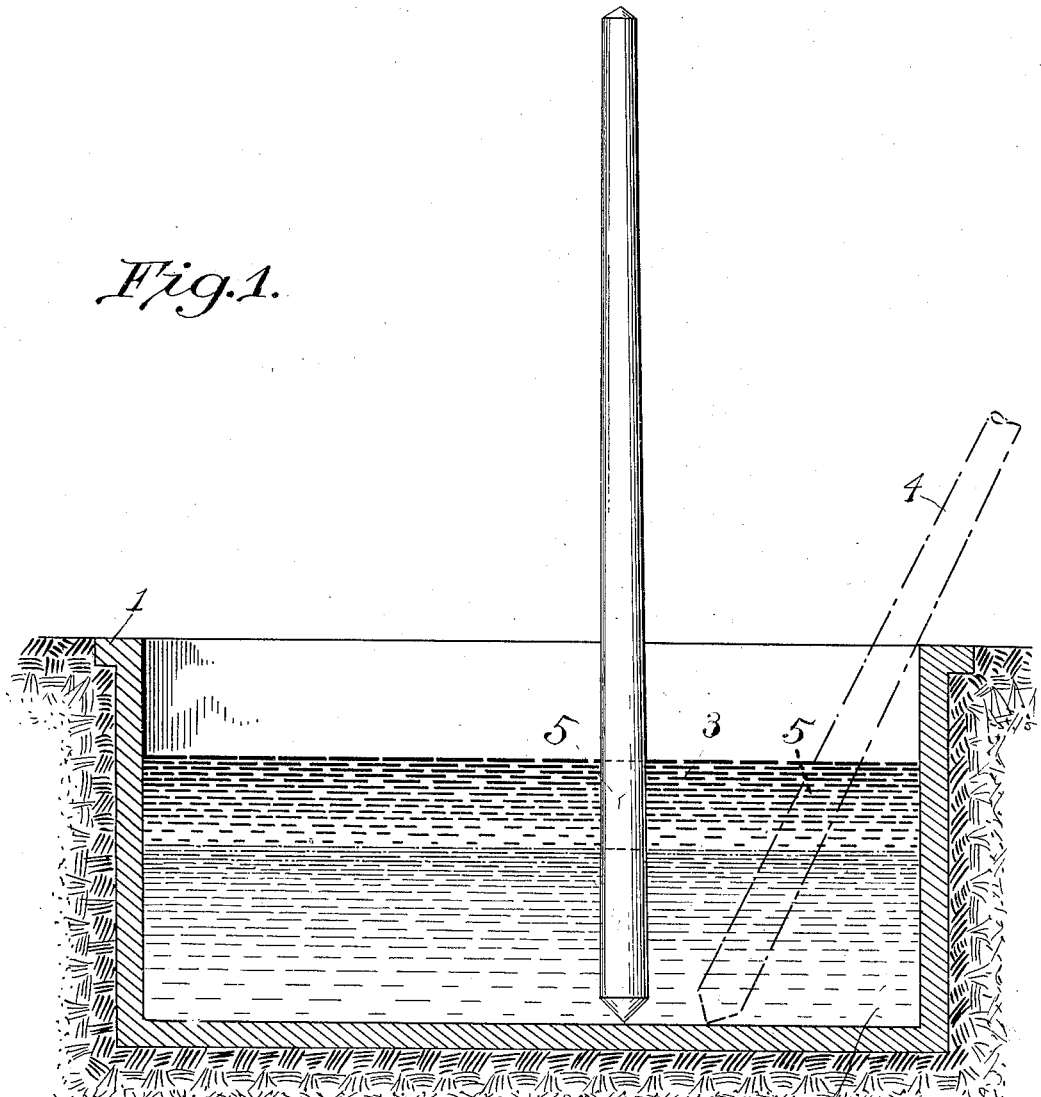

July 7, 1925.  1,545,427

P. J. HOWE ET AL

PRESERVATION OF POLES, POSTS, AND THE LIKE

Filed Feb. 11, 1925

INVENTOR
Paul J. Howe
and Randolph Leedom
Eugene E. Brown
ATTORNEY

Patented July 7, 1925.

1,545,427

UNITED STATES PATENT OFFICE.

PAUL J. HOWE, OF RIDGEWOOD, AND RANDOLPH LEEDOM, OF CLIFTON, NEW JERSEY, ASSIGNORS TO THE WESTERN UNION TELEGRAPH COMPANY, OF NEW YORK, N. Y., A CORPORATION OF NEW YORK.

PRESERVATION OF POLES, POSTS, AND THE LIKE.

Application filed February 11, 1925. Serial No. 8,392.

*To all whom it may concern:*

Be it known that we, PAUL J. HOWE and RANDOLPH LEEDOM, citizens of the United States, residing at Ridgewood, in the county of Bergen, State of New Jersey, and Clifton, Passaic County, and State of New Jersey, respectively, have invented certain new and useful Improvements in the Preservation of Poles, Posts, and the like, of which the following is a specification.

This invention relates to the treatment and preservation of porous material, such as wood, especially in an elongated form, such, for example, as poles.

An object of the invention is the treatment of such poles, especially by the open tank method, in such manner that the preservative is applied only where needed, whereby waste thereof is prevented. Other objects of the invention will appear from the further description.

Three general methods have been commonly used in the application of preservatives to pole timber, namely the pressure method, in which the preservative is forced under high pressure into the wood, the superficial method in which the preservative is merely brushed or sprayed on the pole, and the open tank method in which the wood is held for given periods in hot and cold preservatives.

When poles are standing in line, the section most liable to decay is that extending from a point of about one foot above the ground line to a point between one and one-half and two feet below the ground line. It is essential to treat this section, known as the ground line section, with creosote, inasmuch as this oil is practically the only practical preservative which will not leach out of the wood. It is not as important to treat the buried section of the pole below the ground line section with a non-leaching preservative, as it is not subjected to the action of surface water to so great an extent as the ground line section, nor to the action of the air on volatile elements of the preservative.

In the open tank treatment of poles, however, up to the present time, it has been customary to treat the entire butt section, that is, the ground line section as well as the section of the pole below the ground line section, to a point about one and one-half feet above the ground line, with creosote. Creosote is a comparatively expensive product and it is therefore of great advantage to limit its use to the ground line section only, which is the only part of the pole at which it is actually required.

Our invention includes, not only the impregnation of the ground line section of the pole with creosote, but a simultaneous impregnation of the lower section of the butt, that is, the section below the ground line section, with a cheap and effective preservative, especially by means of the open tank method.

To carry out our process we place a layer of liquid in the tank, the specific gravity of which is high compared to that of the creosote, and we prefer a liquid which is immiscible therewith. We then flow an upper stratum of creosote on the lower stratum of heavier liquid, upon which the creosote stratum floats. The liquid of the lower and heavier stratum, on which the creosote is floated, may or may not be a wood preservative, as conditions require.

Our process involves a heat treatment and we therefore use as a lower stratum a liquid one which boils at a higher temperature than that at which we treat the poles.

We prefer for the lower stratum liquid, that is the liquid on which the creosote is floated, an aqueous salt preservative solution for the floating of the creosote and for the treatment of the butt section of the pole below the ground line, and of various salt solutions we prefer a 3% solution of zinc chloride in water, the same being saturated with ordinary salt or sodium chloride. Such a solution has a specific gravity of about 1.21, while its boiling point is in the neighborhood of 226° F. While we prefer the specific solution here indicated on account of its effectiveness and the low cost of the constituents thereof, nevertheless we do not wish to be limited strictly thereto but equivalents of the components therein may be substituted therefor.

We have used creosote oil having a specific gravity of about 1.03, but this also may be varied and still be within the scope of our invention.

The temperature treatment of the poles is 220° F. which temperature we prefer, but this also may be varied within limits.

The liquids mentioned are very effective for the treatment of the poles and they are of such a nature that they do not mix practically at all.

Figure 2:

Referring to the accompanying drawings;

Fig. 1 is a cross section of an open tank with a pole therein for treatment; and Fig. 2 is an elevational view of a pole treated according to our method.

In the drawings, 1 designates an open tank in which is a lower layer or stratum 2 of liquid, and an upper layer or stratum 3 of the liquid with which it is desired to impregnate the ground line section. 4 designates a pole within the tank for treatment and such pole may be held upright by suitable means (not shown) or it may be allowed to rest against the upper edge of the tank as may be desired. No matter in what position the pole may be while being treated, after treatment thereof it may be allowed to lean or rest against the edge of the tank before withdrawal thereof, should it be convenient to do so.

We prefer to use a tank so dimensioned that a number of poles may be treated simultaneously.

The length of the ground line section 5 of the pole to be treated with creosote may be increased or diminished by correspondingly increasing or decreasing the thickness of the layer 3; or to some extent by tilting the pole to such an angle that the proper length 5 thereof will be within the creosote layer; while the position of this section on the pole may be varied by varying the thickness of the liquid layer 2, which correspondingly varies the length of the butt section 6 treated with the zinc chloride sodium chloride solution.

We have successfully treated poles by our method with a saving of approximately 30% in creosote oil, and we have found a very clear line of demarcation between the section treated with the salts solution and the section treated with the creosote oil.

For some purposes, it may be immaterial whether the lower liquid stratum 2 have preservative properties or not, and in such case any suitable solution liquid may be substituted therefor, provided only that it had the proper specific gravity to float the creosote and a sufficiently high boiling point so that it will not boil at the temperature of treatment of the poles.

What we claim is:

1. An open tank method of treating the ground line section only of poles with creosote which comprises floating a layer of creosote on a layer of liquid immiscible therewith and having a higher specific gravity than that of the creosote in an open tank, placing the poles to be treated in said open tank so that they extend within both layers, and allowing them to soak therein at atmospheric pressure.

2. An open tank method of treating the ground line section only of poles with creosote which comprises floating a layer of creosote on a layer of liquid immiscible therewith and having a higher specific gravity than that of the creosote in an open tank, the boiling point of said liquid being higher than the temperature of treatment of the poles, and applying heat thereto while the poles to be treated extend within both layers.

3. An open tank method of treating the ground line section only of poles with creosote which comprises floating a layer of creosote on a layer of liquid immiscible therewith and having a higher specific gravity than that of the creosote in an open tank, the boiling point of said liquid being higher than the temperature of treatment of the poles, the thicknesses of the two liquid layers being so chosen that a desired length of intermediate section of the pole will be treated with creosote when the pole is supported at a fixed level with respect to the tank, supporting said poles at said fixed level within the tank, and applying heat thereto while the poles to be treated extend within both layers.

4. An open tank method of treating the ground line section only of poles with creosote and simultaneously treating the butt section of such poles with an aqueous preservative, which comprises floating a layer of creosote on a layer of aqueous preservative immiscible therewith and having a higher specific gravity than that of the creosote in an open tank, placing the poles to be treated in said open tank so that they extend within both layers, and allowing them to soak therein.

5. An open tank method of treating the ground line section only of poles with creosote, and simultaneously treating the butt section of such poles with an aqueous preservative, which comprises floating a layer of creosote on a layer of aqueous preservative immiscible therewith and having a higher specific gravity than that of the creosote in an open tank, supporting said poles substantially upright in contact with the bottom of said tank, and allowing them to soak therein.

6. An open tank method of treating the ground line section only of poles with creosote and simultaneously treating the butt section of such poles with an aqueous preservative, which comprises floating a layer of creosote on a layer of aqueous preservative immiscible therewith and having a higher specific gravity than that of the creosote in an open tank, the boiling point of the aqueous preservative being higher than the temperature of treatment of the poles, and applying heat thereto while the poles to be treated extend within both layers.

7. An open tank method of treating the ground line section only of poles with creosote and simultaneously treating the butt section of such poles with an aqueous preservative, which comprises floating a layer of creosote on a layer of aqueous perservative immiscible therewith and having a higher specific gravity than that of the creosote in an open tank, the thicknesses of the two liquid layers being so chosen that a desired length of intermediate section of the pole will be treated with creosote when the pole is supported at a fixed level with respect to the tank, supporting said poles at said fixed level within the tank, and allowing them to soak therein.

8. An open tank method of treating the ground line section only of poles with creosote and simultaneously treating the butt section of such poles with an equeous preservative, which comprises floating a layer of creosote on a layer comprising a 3% solution of zinc chloride in water saturated with sodium chloride, placing the poles to be treated in said open tank so that they extend within both layers, and allowing them to soak therein at atmospheric pressure.

9. An open tank method of treating the ground line section only of poles with creosote and simultaneously treating the butt section of such poles with an aqueous preservative, which comprises floating a layer of creosote on a layer comprising a 3% solution of zinc chloride in water saturated with sodium chloride, placing the poles to be treated in said open tank so that they extend within both layers, and applying heat thereto at a temperature below the boiling point of the zinc chloride sodium chloride solution at atmospheric pressure.

10. An open tank method of treating the ground line section only of poles with creosote and simultaneously treating the butt section of such poles with an aqueous preservative, which comprises floating a layer of creosote on a layer comprising a 3% solution of zinc chloride in water saturated with sodium chloride, and heating to 220° F. while the poles to be treated extend within both layers.

11. An open tank method of treating the ground line section only of poles with creosote and simultaneously treating the butt section of such poles with an aqueous preservative, which comprises floating a layer of creosote on a layer comprising a 3% solution of zinc chloride in water saturated with sodium chloride, the thicknesses of the two liquid layers being so chosen that a desired length of intermediate section of the pole will be treated with creosote and the butt section therebelow will be treated with the zinc chloride sodium chloride solution when the pole is supported at a fixed level with respect to the tank, supporting said poles at said fixed level within the tank, and heating to 220° F. at atmospheric pressure.

In testimony whereof we affix our signatures.

PAUL J. HOWE.
RANDOLPH LEEDOM.